Jan. 29, 1974  J. L. ORNSTEIN  3,788,821
COMPOSITE THERMOSTAT MATERIAL
Filed Dec. 21, 1970
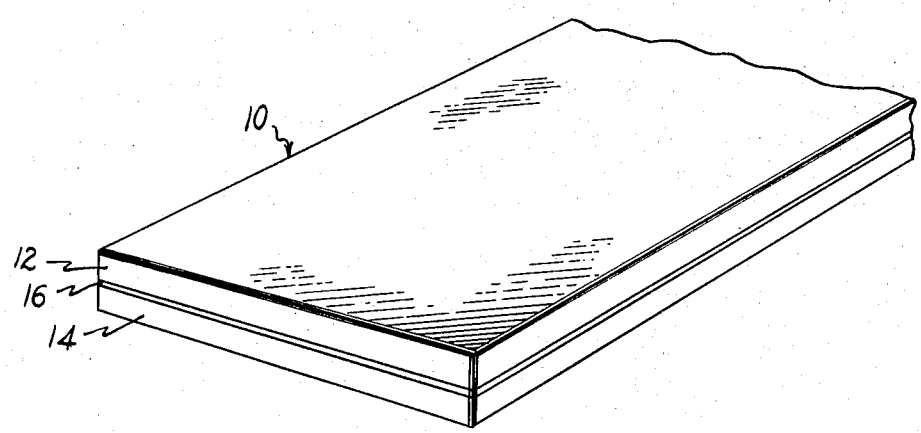
INVENTOR.
BY *Jacob L. Ornstein*
Att'y.

United States Patent Office

3,788,821
Patented Jan. 29, 1974

3,788,821
COMPOSITE THERMOSTAT MATERIAL
Jacob L. Ornstein, Norton, Mass., assignor to Texas Instruments Incorporated, Dallas, Tex.
Filed Dec. 21, 1970, Ser. No. 100,159
Int. Cl. B23p *3/00*
U.S. Cl. 29—195.5     1 Claim

ABSTRACT OF THE DISCLOSURE

A relatively low cost multilayer composite thermostat material is disclosed having predetermined characteristics of electrical resistivity and flexivity, and including first and second layers of preselected metallic alloys having relatively high and relatively lower coefficients of thermal expansion respectively, and an intermediate layer of a substantially nickel-free metallic alloy having a preselected thickness relative to the total thickness of the composite material such that the composite material has a resistivity of between approximately 625 to 725 ohms per circular mil foot and a flexivity of between approximately $200 \times 10^{-7}$ to $220 \times 10^{-7}$ inch per inch per degree Fahrenheit. In the disclosed composite, the first preselected metallic alloy comprises a material comprising by weight approximately 71% to 76% manganese, 9% to 19% copper, and 9% to 17% nickel, while the second preselected metallic alloy comprises a metallic alloy such as the material commonly referred to as Invar, which comprises by weight approximately 35½% to 36½% nickel and the balance iron. The first and second layers are metallurgically bonded to respective opposite surfaces of the intermediate layer of the preselected ferrous alloy to define a composite thermostat material having comparable characteristics to presently available thermostat material, only available at substantially higher costs.

---

The present invention relates generally to thermostat materials and more particularly is directed to an improved composite thermostat material.

A variety of composite thermostat materials is presently available which comprise bimetal structures including a pair of layers of metallic alloys which are suitably attached to each other with one of the layers having a relatively high coefficient of thermal expansion and the other of the layers having a relatively lower coefficient of thermal expansion in order to achieve desired characteristics of flexivity such that deflection of the thermostat material occurs in response to temperature variations, in the manner known to those skilled in the art. By suitably selecting the characteristics of the layers of material, a thermostat material may be fabricated having various desired characteristics, such as resistivity, flexivity, corrosion resistance, mechanical strength, etc. depending upon the ultimate use which is intended for the composite material. For example, in many applications, relatively lower resistivity levels may be suitable although a flexivity of the order of approximately $200 \times 10^{-7}$ to $220 \times 10^{-7}$ inch per inch per degree Fahrenheit is generally desirable over a temperature range of several hundred degrees Fahrenheit. In achieving such characteristics, in certain instances it is possible to replace a portion of the volume occupied by the two layers of materials comprising the bimetal structure with less expensive, less scarce materials, while still providing a structure having characteristics which are suitable for the particular application. However, in other applications, such a lower resistivity level may not be satisfactory but, the particular application involved may require that cost savings be achieved such as by replacing portions of the relatively expensive and/or scarce metallic alloys ordinarily utilized in forming the bimetal thermostat material with less expensive materials. Thus, a significant problem arises in attempting to effect a substitution of less expensive materials for more expensive materials, while still retaining certain characteristics deemed appropriate for the particular application. Furthermore, in recent years the necessity for such cost savings as well as minimization of the use of relatively scarce materials has become increasingly important, particularly as the usage of certain relatively scarce materials has continually increased, resulting in increased costs and decreased available supplies. For example, materials such as nickel and copper typically are utilized as constituents in many presently available thermostat metal composites, but a substantial need has arisen for replacing such materials to the extent possible with more readily available and less expensive materials, while still providing a composite thermostat material having a relatively high resistivity of the order of 625 to 725 ohms per circular mil foot, and a requisite flexivity level of between approximately $200 \times 10^{-7}$ to $220 \times 10^{-7}$ inch per inch per degree Fahrenheit.

Accordingly, it is an object of the present invention to provide an improved composite thermostat material having desired properties of flexibility, resistivity, etc. in which the usage of certain materials is substantially minimzed.

It is a further object of the present invention to provide an improved composite thermostat material which is durable in use and relatively economical to fabricate.

Various additional objects and advantages of the present invention will become readily apparent from the following detailed description and accompanying drawing wherein:

The sole drawing is a perspective view of the composite thermostat material of the present invention.

Referring in detail to the drawing, a strip of composite thermostat material is illustrated and indicated generally by the reference numeral 10. The composite thermostat material illustrated includes a first outer layer 12 of a first preselected metallic alloy having a relatively high coefficient of thermal expansion, a second outer layer 14 of a second preselected metallic alloy having a relatively lower coefficient of thermal expansion than the first preselected material, and an intermediate layer of a preselected ferrous alloy which comprises a substantially nickel-free metallic alloy having a preselected thickness relative to the total thickness of the composite material. The composite material illustrated preferably has a resistivity of between approximately 625 to 725 ohms per circular mil foot, while retaining a flexivity of between approximately $200 \times 10^{-7}$ to $220 \times 10^{-7}$ inch per inch per degree Fahrenheit over a predetermined temperature range of between approximately 50° Fahrenheit to 200° Fahrenheit. The first and second outer layers 12 and 14 are metallurgically bonded, preferably solid-phase bonded, to the intermediate layer 16, the bonds between the various metallic layers extending substantially throughout the entire contiguous surfaces of the layers which define the composite material 10. Preferably, the various metallic layers are solid-phase bonded together in the manner described, for example, in U.S. Pat. Nos. 2,691,815 and 2,753,623. However, if desired, various other bonding techniques may be employed for metallurgically bonding the layers together within the scope of the present invention. Thus, the illustrated composite thermostat material 10 comprises an integral unit adapted to flex in response to temperature changes and is suitable for use in a wide variety of applications in view of its resistivity and flexivity characteristics, which are comparable to presently employed thermostat materials only available at substantially higher cost.

In the illustrated embodiment, the first pre-selected metallic alloy comprising the first outer layer 12 preferably comprises a metallic alloy comprising by weight approximately 71% to 76% manganese, 9% to 19% copper, and 9% to 17% nickel. The second preselected metallic alloy comprising the second outer layer 14 preferably comprises a metallic alloy having a substantially lower coefficient of thermal expansion than the first preselected metallic alloy such as the material commonly referred to as Invar, which comprises by weight approximately 35½% to 36½% nickel and the balance iron. In addition, in accordance with the rinciples of the present invention, in order to substantially reduce expense and to minimize the usage of relatively scarce materials, the intermediate layer 16 is provided to replace a portion of the volume of the composite material 10 which would otherwise be occupied by the first and second outer layers 12 and 14. In this regard, the preselected ferrous alloy comprising the intermediate layer 16 preferably comprises a preselected substantially nickel-free metallic alloy which is arranged to occupy a preselected thickness relative to the total thickness of the composite material 10 such that the resultant composite material retains a resistivity of between approximately 625 to 725 ohms per circular mil foot, and preferably approximately 675 ohms per circular mil foot, and a flexivity of between approximately $200 \times 10^{-7}$ to $220 \times 10^{-7}$ inch per inch per degree Fahrenheit over a temperature range of between approximately 50° Fahrenheit to 200° Fahrenheit. Thus, the illustrated composite material 10 is adapted for use in providing a direct replacement for present commercially available bimetal composite thermostat materials, which are substantially more expensive. More particularly, the thickness of the intermediate layer relative to the thickness of the overall composite material 10 may be arranged such that the intermediate layer has a thickness comprising between approximately 10% to 30% of the total thickness of the composite material, while the first and second layers 12 and 14 are of approximately equal thickness with respect to each other and comprise the remaining thickness of the composite material. However, in one preferred embodiment of the present invention, the intermediate layer has a thickness comprising approximately 15% of the total thickness of the composite material while the first layer 12 has a thickness comprising approximately 44% of the total thickness of the composite material, and the second layer 14 has a thickness comprising approximately 51% of the total thickness of the composite material.

Although a variety of substantially nickel-free metallic alloys may be utilized as the intermediate layer 16, in accordance with the principles previously described, several examples of materials have been found to be particularly adapted for use in this regard in order to provide a composite material having the previously described properties of resistivity, flexivity, etc. In one preferred embodiment of the present invention, the intermediate layer comprises a substantially nickel-free metallic alloy sold by Texas Instruments Inc. under the trade designation Standard Alloy 71, which comprises by weight approximately 16.40% to 17.60% chromium, 3.00% to 4.40% aluminum, 0.45% to 0.80% manganese, 0.10% maximum carbon, 0.025% maximum phosphorous, 0.025% maximum sulphur, 0.45% to 0.80% silicon, and the balance iron. In another embodiment of the present invention, the intermediate layer 16 may comprise a substantially nickel-free metallic alloy such as that sold by Carpenter Technology Corporation under the trade designation Carpenter No. 1-JR, which comprises by weight approximately 12.00% to 14.00% chromium, 3.25% to 4.50% aluminum, 0.15% maximum carbon, and the balance iron. Such examples of materials, of course, are not exclusive, but are merely set forth as examples of materials which have been found to be particularly suited for use in providing the intermediate layer 16. In this regard, it may be noted that in forming the intermediate layer 16 comprising the materials described in the above examples, the thickness of the intermediate layer may vary between approximately 10% to 30% of the total thickness of the composite, while the first and second layers 12 and 14 may be of substantially equal thickness with respect to each other and comprise the remainder of the total thickness of the composite material while, in certain preferred embodiments, the intermediate layer may comprise approximately 15% of the total thickness of the composite material while the first layer 12 may comprise approximately 44% of the total thickness of the composite material and the second layer 14 may comprise approximately 51% of the total thickness of the composite material as previously explained. In addition, it may be further noted, that as a result of utilizing these above-described examples of materials in providing the intermediate layer 16, the resultant composite material 10 has a resistivity in the range of between approximately 625 to 725 ohms per circular mil foot, while having a flexivity of between approximately $200 \times 10^{-7}$ to $220 \times 10^{-7}$ inch per inch per degree Fahrenheit. Moreover, in a preferred embodiment of the present invention, the composite material 10 may be provided having a resistivity of approximately 675 ohms per circular mil foot and a flexivity of approximately $210 \times 10^{-7}$ inch per inch per degree Fahrenheit, utilizing the above-described materials in the thickenesses specified.

As a result, a composite thermostat material may be provided which is substantially more economical than presently available bimetal thermostat materials having comparable properties, while providing such a material in which materials having relatively scarce and/or relatively expensive constituents is minimized. In addition, it has been found that a composite thermostat material comprising the above-described materials may be successfully fabricated in varying overall thicknesses ranging from approximately 0.003" to 0.125" while retaining the requisite flexivity and resistivity characteristics, as previously described. Furthermore, in the above-described examples, it may be noted that the coefficient of thermal expansion of the first preselected material comprising the first layer 12 which, as previously indicated, is relatively high preferably comprises approximately $15.0 \times 10^{-6}$ inch per inch per degree Fahrenheit, while the coefficient of thermal expansion of the second preselected material comprising the second layer 14, which is relatively lower, preferably comprises approximately $0.7 \times 10^{-6}$ inch per inch per degree Fahrenheit. Thus, there is a difference of approximately an order of magnitude between the coefficients of thermal expansion of the first and second layers 12 and 14, thereby providing a composite thermostat material, which yields desired temperature responsive properties and provides a useful deflection characteristic over a relatively wide temperature range. These materials also may be readily secured together utilizing suitable roll bonding techniques, or the like, while achieving accurate control over overall layer thickness in the resultant composite material.

Thus, several examples of composite thermostat material have been described hereinabove which may be seen to be characterized by useful properties in terms of flexivity, resistivity, ease in processing, etc. directly comparable with previously available bimetal composite materials, while achieving significant cost savings and a substantial reduction in the usage of materials having constituents which may be relatively scarce and/or relatively expensive.

Various changes and modifications in the above-described embodiments will be readily apparent to those skilled in the art and any of such changes and modifications are deemed to be within the spirit and scope of the present invention as set forth in the appended claim.

What is claimed is:

1. A composite three-layer thermostat material for use in substitution for a two-layer thermostat metal material having one layer of a metallic alloy having a composition by weight of about 71 to 76% manganese, 9 to 19% copper and 9 to 17% nickel and having one layer of a metallic alloy having a composition by weight of about 35½ to 36½% nickel and the balance iron where said layers have a relative thickness providing said two-layer thermostat metal material with a resistivity of about 675 ohms per circular mil foot, said three-layer thermostat material comprising a first outer layer of a first preselected metallic alloy having a relatively high coefficient of thermal expansion and comprising by weight approximately 71% to 76% manganese, 9% to 19% copper, and 9% to 17% nickel, a second outer layer of a second preselected metallic alloy having a relatively lower coefficient of thermal expansion than said first preselected metallic alloy and comprising by weight approximately 35½% to 36½% nickel and the balance iron, and an intermediate layer of a preselected ferrous alloy, said intermediate layer having a thickness comprising from 10 to 30% of the total thickness of said three-layer composite material and said first and second layers having thicknesses substantially equal to each other, said preselected ferrous alloy comprising an alloy selected from the group consisting of an alloy having a composition by weight of approximately 16.4 to 17.6% chromium, 3.00 to 4.40% aluminum, 0.45 to 0.80% manganese, 0.10% maximum carbon, 0.025% maximum phosphorous, 0.025% maximum sulphur, 0.45 to 0.80% silicon, and the balance iron, and an alloy having a composition by weight of approximately 12.00 to 14.00% chromium, 3.25 to 4.50% aluminum, 0.15% maximum carbon, and the balance iron, said composite material having a resistivity of between approximately 625 to 725 ohms per circular mil foot and having a flexivity of between approximately $200 \times 10^{-7}$ to $220 \times 10^{-7}$ inch per inch per degree Fahrenheit in the temperature range from 50° F. to 200° F.

References Cited

UNITED STATES PATENTS

| 2,461,518 | 2/1949 | Chace | 29—195.5 |
| 2,470,753 | 5/1949 | Alban | 29—195.5 |

L. DEWAYNE RUTLEDGE, Primary Examiner

J. E. LEGRU, Assistant Examiner

U.S. Cl. X.R.

29—196, 196.1